Sept. 15, 1942.  A. G. STIMSON  2,296,123

ELECTRORESPONSIVE DEVICE

Filed Feb. 18, 1941

Inventor:
Allen G. Stimson,
by Harry E. Dunham
His Attorney.

Patented Sept. 15, 1942

2,296,123

UNITED STATES PATENT OFFICE 2,296,123

ELECTRORESPONSIVE DEVICE

Allen G. Stimson, Schenectady, N. Y., assignor to General Electric Company, a corporation of New York Application February 18, 1941, Serial No. 379,514

5 Claims. (Cl. 175—345)

My invention relates to electroresponsive devices and particularly to electromagnetic relays for controlling the starting circuits of split phase alternating current motors.

It is well understood that the usual method of starting a single phase induction motor consists in energizing a split phase starting winding during the starting period and then disconnecting the starting winding after the motor has come up to speed. Many relays have heretofore been proposed for controlling the starting circuit of such a motor in response to line current. Such relays ordinarily pick up upon the initial high surge of current through the running winding to close the circuit of the starting winding, and subsequently drop out to disconnect the starting winding when the line current diminishes to its running value. In order to obtain suitable operating characteristics in these current-responsive relays, it has frequently been necessary to design special motors providing an unusually high surge of starting current. Furthermore, the usefulness of current relays is distinctly limited, since any given current relay may be used only with motors of a predetermined current rating. On the other hand, it will be apparent that if a voltage responsive relay can be designed to effect the proper connection and disconnection of the starting circuit, the principal disadvantage of the current responsive relay will be overcome.

Accordingly, it is an object of my invention to provide a voltage responsive relay suitable for controlling the starting circuit of a split phase alternating current motor.

It is a further object of my invention to provide an electromagnetic relay suitably responsive to the voltage appearing across the starting winding of a split phase alternating current motor and arranged to control said winding.

It is a further object of my invention to provide an electromagnetic relay having a large differential between the pick-up and drop-out values of its energizing current.

A still further object of my invention is to provide an electromagnetic starting relay for split phase alternating current motors which has wide application to motors of various ratings and which is simple, inexpensive to manufacture and economical and efficient to use.

Figure 1:
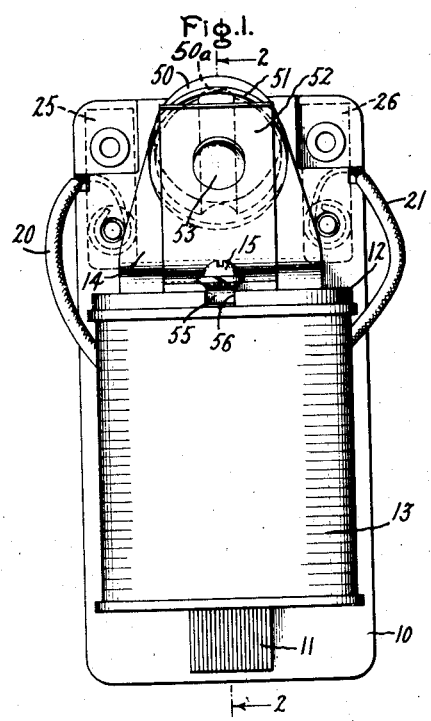
Figure 2:
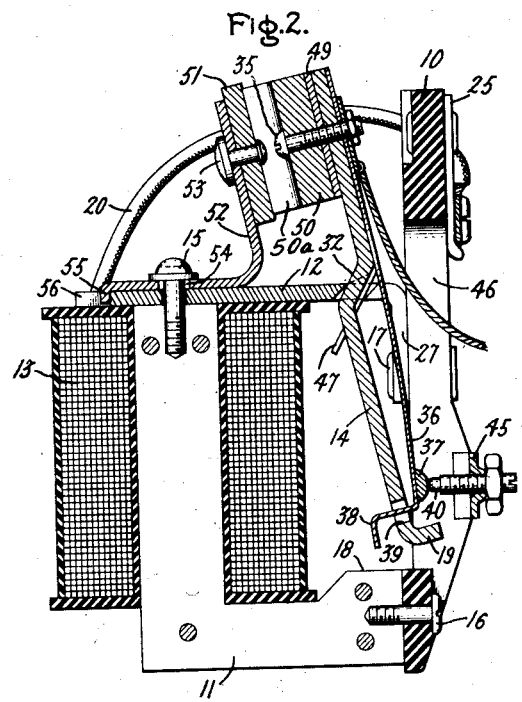
Figure 3:
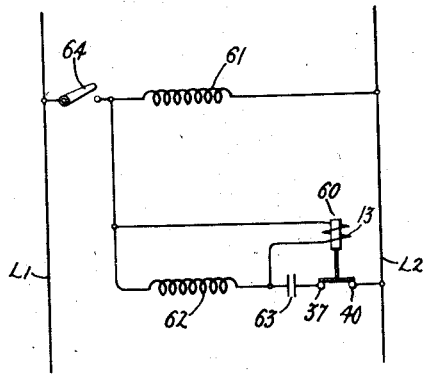

Further objects and advantages of my invention will be apparent from a consideration of the following detailed specification taken in connection with the accompanying drawing in which Fig. 1 is a front elevation of a relay embodying my invention; Fig. 2 is a sectional view taken along the line 2—2 of Fig. 1; Fig. 3 is a simplified circuit diagram of connections showing how my relay may be connected to control the starting winding of a split phase alternating current motor; and Fig. 4 is an exploded perspective view showing the structural detail of the pivotal connection between the frame and armature of my relay.

Referring now to the drawing, and particularly to Figs. 1 and 2, I have shown my invention in one form as applied to a relay comprising a base 10 of suitable insulating material upon which is mounted a magnetic frame 11, 12 carrying an operating coil 13 and a movable armature 14. The magnetic frame comprises a core 11 of laminated magnetizable material and a flat magnetic member 12 secured to the core 11 by suitable means shown as a bolt 15. As shown, the frame 11, 12 is attached to the base 10 by means of a bolt 16 and rivets 17. That end of the C-shaped core 11, 12 which lies adjacent one end of the armature 14 is machined to provide a pole face 18, while a cooperating pole face 19 is arranged upon the armature 14 by bending the end of the armature upwardly as shown. The area of the pole face 19 is of the same order of magnitude as that of the pole face 18. The turned-up form of the pole face 19 results in a larger cross-sectional area of the flux path across the air gap between the pole faces and provides a smaller gradient of flux as the armature closes. These conditions add to the stability of the armature in its energized position. The length of the air gap with the armature in its energized position should be made as small as mechanical convenience permits.

The energizing coil 13 is mounted upon the rear leg of the C-shaped core 11, 12 between the lower leg of the core and the magnetic member 12 in such a position as to set up a circulating flux through the core 11, the magnetic member 12, the armature 14 and the air gap between the pole faces 18 and 19. Flexible lead wires 20 and 21 from the energizing coil 13 are connected respectively to conducting terminals 25 and 26 mounted upon the base 10. In operation the flux set up by the coil 13 exerts upon the armature 14 a force tending to minimize the length of the air gap between the pole faces 18 and 19. As a result of the force the armature rotates about its pivot point in a clockwise direction to bring the lower half of the armature into a nearly vertical position above the pole face 18. The radius of curvature through which the pole face 19 moves is large relative to the length of the arc through which it moves, so that the pole face 19 moves in a line approximately perpendicular to the normal from the pole face 18, or approximately parallel to the surface of the pole face 18. Specifically, the pole face 19 moves through an arcuate path of relatively large radius, the tangent to one end of which is parallel to the pole face 18.

Figure 4:
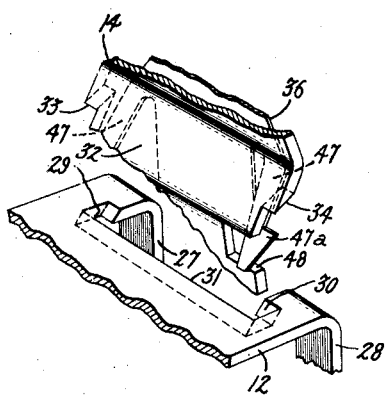

In order to pivotally support the armature 14, the portion 12 of the magnetic frame is provided with ears 27 and 28 notched at 29 and 30, respectively, as shown in detail at Fig. 4. The notches 29 and 30, together with an edge 31 of the frame member 12, form, in effect, a lateral slot across the frame member 12 for receiving the lower end of the armature 14. The two end portions of the armature 14 are flat and substantially parallel, as shown in Figs. 2 and 4, but are offset by an intermediate bent portion 32. As best shown at Fig. 4, the offset portion 32 of the armature is provided with abutments 33 and 34 adapted to seat upon the top of the ears 27 and 28, respectively; that is, the width of the armature below the abutments is slightly less than the distance between the bases of the notches 29 and 30 in the ears 27 and 28. Since the abutments 33 and 34 lie intermediate the ends of the offset section 32 of the armature, the edge 31 of the frame member 12 forming the rear side of the slots 29 and 30 is tapered or undercut as shown in Figs. 2 and 4. The forward edges of the notches 29 and 30 are tapered in a parallel direction as shown to fit the underside of the offset portion 32 of the armature.

Attached to the upper end of the armature by a bolt 35 is a cantilever spring 36 which carries at its lower end a movable contact 37. The cantilever spring 36 extends between the ears 27 and 28 of the frame 12 and has at its lower end a hooked portion 38 extending through an aperture 39 in the armature 14. By means of this construction the contact 37 is permitted to remain in engagement with a stationary contact 40 until the armature 14 has completed a part of its operating movement. However, before the armature 14 takes up its final energized position it comes into engagement with the hooked portion 38 of the cantilever spring 36 and withdraws the movable contact 37 from its engagement with the fixed contact 40. The fixed contact 40 is shown as an adjustably retractable screw mounted in a conducting terminal 45 attached to the base 10. By adjustment of the contact 40 the position of the movable contact 37 with reference to the deenergized position of the armature 14 may be adjusted as desired. In order to permit engagement of the contacts 37 and 40 and to provide space for the operation of the armature 14, the insulating base 10 is longitudinally slotted at 46 as indicated at Fig. 2.

I order to latch the armature 14 in pivotal connection with the frame member 12, the cantilever spring 36 is provided with an ear 47 at each side of its center to latch with the ears 27, 28 of the frame member. The ears 47 are each bent downwardly along the lower surface of the offset portion 32 of the armature, as shown in broken lines in Fig. 4, and are provided with hooked end portions 47a which extend beyond the sides of the armature below the abutments 33 and 34. Thus the ears 47 loosely engage the ears 27 and 28 to latch the armature in position. To retain the ears 47 in bent position, the armature has a notch 48 at each side near the lower end of the offset portion 32, and the ends of the ears 47 extend through the notches 48.

Mounted upon the rear side of the upper end of the armature 14 and separated therefrom by a non-magnetic shim 49 I have shown a permanent magnet 50. As indicated at Figs. 1 and 2, the magnet is formed as a disk with a diametrical groove 50a across its face, and the magnetization is such that the semicircular halves of the grooved face are of opposite polarity. The permanent magnet 50 may be attached to the armature by means of the bolt 35 which also holds in place the cantilever spring 36. In order to obtain sufficient coercive force while limiting the physical proportions of the magnet, I prefer to use for the magnet an alloy comprising six to fifteen per cent aluminum, twelve to thirty per cent nickel, about five per cent copper if desired, and the remainder of iron, such as described and claimed in Patent 1,947,274, issued February 13, 1934, to William E. Ruder and assigned to the same assignee as the present application or in Patent 1,968,569, issued July 31, 1934, to William E. Ruder and assigned to the same assignee as the present application.

In order to complete a magnetic circuit for the permanent magnet 50 and thereby releasably retain the armature 14 in its deenergized position, a magnetic keeper 51 is mounted upon a bracket 52 by means of a rivet 53 or other suitable fastening means. The bracket 52, which preferably is formed of non-magnetic material, may be adjustably mounted upon the frame 11, 12 by means of the bolt 15 and an elongated aperture 54 in the bracket. In order to lock the bracket 52 against rotation about the bolt 15 the bracket is provided with a turned down ear 55 adapted to engage a slot 56 in the frame member 12.

If desired, a non-magnetic shim may be fastened to the magnet 50 or to the keeper 51 to prevent direct contact between the magnet and the keeper. Such a shim will tend to eliminate variations in magnetic action arising from small particles of dirt on the face of the magnet or keeper.

The effect of the magnet 50 is to magnetically bias the armature 14 to its deenergized position and releasably retain it therein. In addition to its magnetic function of biasing the armature to its deenergized position and releasably sealing it, the permanent magnet 50 is so located on the armature assembly that it counterbalances the weight of the armature 14 about its pivot point. As a result the armature is nearly balanced mechanically, and its electrical response is almost unaffected by its position.

The armature pivot construction described above serves to assist the weight of the magnet 50 in biasing the entire armature assembly downward to thereby maintain a minimum air gap between the pole faces. The weight of the armature and magnet naturally tends to so bias the armature. Furthermore, since the horizontal force exerted by the magnet 50 upon its keeper 51 is resisted by a force exerted at the undercut beveled edge of the frame member 12, a downwardly directed vertical component of force is exerted upon the armature at the undercut edge. This vertical component of force assists the weight of the magnet and armature in biasing the latter to its lowermost position.

In Fig. 3 I have shown a diagram of circuit connections for a motor starting arrangement utilizing my circuit controller. In Fig. 3 the circuit controller is schematically indicated at 60 and is connected to control the starting winding of a split phase alternating current motor comprising a running winding 61 and a starting winding 62. In order to displace the phase position of the current in the starting winding 62 with respect to the current in the running winding 61, a capacitor 63 is connected in series with the starting winding. The starting winding circuit is completed through the normally closed contacts 37, 40 of the circuit controller 60. As indicated, the energizing winding 13 of the controller is connected across the terminals of the starting winding 62. In operation, the split phase motor may be connected between line conductors L1 and L2 by closing a manually or automatically operated switch 64. It is well known that the voltage across the terminals of the starting winding 62 will increase as the speed of the motor increases. Therefore, the circuit controller 60 may be so adjusted that the armature will pick up to open the contacts 37, 40 at a speed near the synchronous speed of the motor. When the contacts 37, 40 are opened, the starting winding 62 is disconnected and the motor continues to operate on its running winding alone. Upon disconnection of the starting winding the voltage appearing across this winding experiences a sudden decrease due to the fact that the external energization is removed. However, by induction from the running winding a considerable voltage remains across the terminals of the starting winding. As has been previously pointed out, my circuit controller is so designed that this diminished voltage is sufficient to maintain the controller in its energized position with the contacts separated.

The wide differential between the pick-up and the drop-out voltages of my electromagnetic circuit controller is due largely to the restraining influence of the permanent magnet 50. In order for the relay to pick up the seal between the magnet 50 and its keeper 51 must be broken. It will be evident that the relay may be so designed that the air gap flux required to break this seal is considerably greater than the flux required to maintain the relay in its picked up position. For example, the pick-up voltage may be nearly three times the value of the drop-out voltage. Specifically, in one sample of my relay which has been built and tested it was found that the armature will pick up upon the application of about 140 volts to the energizing coil and will not drop out until the voltage has been diminished to approximately 40 volts.

By way of summary a few of the many advantages of my improved relay may advantageously be considered. Due to the fact that my relay operates in response to voltage rather than in response to a high surge of starting current it is possible to utilize normally closed contacts in the starting winding circuit. The use of normally closed contacts in the starting circuit is advantageous in that it avoids the necessity for closing a circuit upon a high surge of starting current. Furthermore, as has been previously mentioned, it is not necessary in utilizing my improved relay to so design the motor as to provide an abnormally high starting current to operate the starting relay. The use of a voltage responsive operating winding also results in simplification and standardization of the design of starting relays to be used in connection with several motors of different current capacities. A given relay of my design may be used in connection with any motor operating upon the voltage for which the relay is designed, regardless of the horsepower output of the motor. Furthermore, as has been particularly pointed out in the detailed description, the armature of my relay is mechanically balanced so that its electrical operation is approximately the same in any position.

While I have shown and described only a single preferred embodiment of my invention by way of example, many other modifications will occur to those skilled in the art and I, therefore, wish to have it understood that I intend by the appended claims to cover all such variations and modifications as fall within the true spirit and scope of my invention.

What I claim as new and desire to secure by Letters Patent of the United States is:

1. In an electromagnetic relay, a substantially flat horizontally positioned frame member provided with a slot having a bevelled edge, an armature movable between attracted and unattracted positions and comprising two substantially flat parallel end portions joined by an offset portion, one of said end portions being adapted to extend through said slot, a plurality of abutments formed upon said armature intermediate the ends of said offset portion and arranged to seat upon said frame member at the ends of said slot thereby to bring said bevelled edge and said offset portion into juxtaposition, said offset portion and said bevelled edge being so disposed that their surfaces are substantially parallel when said armature is in said attracted position, latching means attached to said armature and extending along the surface of said offset portion to engage said frame adjacent the ends of said slot thereby to retain said abutments in seating engagement with said frame member, and means for exerting a horizontal force upon said armature above said offset portion to force said portion into engagement with said bevelled edge, whereby a downwardly directed vertical component of force is exerted upon said armature to bias it to its lowermost position.

2. In an electromagnetic relay, a substantially flat horizontally positioned frame member provided with a slot having an undercut bevelled edge, an armature comprising two substantially flat parallel end portions joined by an angularly positioned offset portion, abutments formed at opposite sides of said armature intermediate the ends of said offset portion and arranged to seat upon the top of said frame member at the ends of said slot, the angularity of said offset portion and of said bevelled edge being approximately the same, biasing means exerting a substantially horizontal force upon the upper end of said armature in a direction to bring said offset portion into engagement with said undercut bevelled edge, and latching means attached to said armature and engaging said frame member to maintain the engagement between said abutments and the top of said frame member, said latching means comprising a plurality of hooked ears extending along the surface of said offset portion and engaging said frame member adjacent the ends of said slot.

3. In an electromagnetic relay, a flat horizontally positioned frame member provided with a lateral slot having an undercut bevelled edge, an armature comprising two substantially parallel flat end portions joined by an angularly positioned offset intermediate portion, undercut abutments formed at opposite sides of said armature intermediate the ends of said offset portion and arranged pivotally to engage the top of said frame member at the ends of said slot, said armature being provided with notches at each side beneath said abutments, the angularity of said offset portion and of said bevelled edge being approximately the same, a resilient spring strip attached to the upper portion of said armature and extending downwardly in parallel relation to the lower portion of the armature, said spring strip being provided with a pair of ears turned down along the surface of said offset portion of said armature adjacent said abutments, said ears being provided with hooked end portions extending laterally beyond said armature below said abutments and arranged to engage the underside of said frame member at the ends of said slot and to extend through said notches whereby said armature is loosely latched in pivotal relation to said frame member, a permanent magnet mounted upon the upper end of said armature in such a position as to bias said armature about its pivot point to a predetermined position, a keeper of magnetic material adjustably mounted upon said frame member in a position to engage said permanent magnet when said armature is in said predetermined position, whereby said armature is releasably retained in said predetermined position and is biased to its lowermost position by engagement of said offset portion with said undercut bevelled edge.

4. In an electromagnetic relay, a substantially C-shaped core having upper and lower horizontal legs, said upper horizontal leg being provided with a slot having a bevelled edge and said lower horizontal leg being formed to provide a first pole face, an armature comprising two substantially flat end parallel portions joined by an angularly disposed offset portion, the angularity of said offset portion and of said bevelled edge being approximately the same, one of said end portions being adapted to extend through said slot and to provide at its lower edge a second pole face spaced from said first pole face, a plurality of abutments formed upon said armature intermediate the ends of said offset portion and arranged to seat upon said frame member at the ends of said slot thereby pivotally to support said armature for lateral movement of said second pole face between maximum and minimum air gap positions along a path having a tangent substantially parallel to said first pole face at said minimum air gap position, biasing means cooperating with said armature above said offset portion for biasing said second pole face to said maximum air gap position and forcing said offset portion into engagement with said beveled edge thereby to exert a downwardly directed vertical component of force upon said armature to bias said armature to its lowermost position, and latching means attached to said armature and engaging said upper horizontal leg to maintain the engagement between said upper abutment and the top of said upper horizontal leg, said latching means comprising a plurality of hooked ears extending along the surface of said offset portion and engaging said upper horizontal leg adjacent the ends of said slot.

5. In an electromagnet relay, a substantially C-shaped core having upper and lower horizontal legs, said upper horizontal leg being substantially flat and provided with a transverse slot having an undercut beveled edge and said lower horizontal leg being formed to provide a first pole face, an armature comprising two substantially flat parallel end portions joined by an angularly positioned offset portion, the angularity of said offset portion and of said beveled edge being approximately the same, one of said end portions being adapted to extend through said slot and to provide at its lower edge a second pole face spaced from said first pole face, abutments formed at opposite sides of said armature intermediate the ends of said offset portion and arranged to seat upon the top of said upper horizontal leg at the ends of said slot thereby pivotally to support said armature for lateral movement of said second pole face between maximum and minimum air gap positions along a path having a tangent substantially parallel to said first pole face at said minimum air gap position, a permanent magnet mounted upon said armature above said offset portion to counterbalance said armature, a keeper of magnetizable material positioned adjacent said permanent magnet to complete a flux path therewith independent of said armature, said magnet biasing said armature to said maximum air gap position and exerting a substantially horizontal force upon the upper end of said armature in a direction to bring said offset portion into engagement with said undercut beveled edge, and latching means attached to said armature and engaging said upper horizontal leg to maintain the engagement between said abutments and the top of said upper horizontal leg, said latching means comprising a plurality of hooked ears extending along the surface of said offset portion and engaging said upper horizontal leg adjacent the ends of said slot.

ALLEN G. STIMSON.